United States Patent
Jiang et al.

(10) Patent No.: US 9,516,020 B2
(45) Date of Patent: Dec. 6, 2016

(54) ACCESSING VIRTUAL DESKTOPS VIA IMAGE SCANNING

(71) Applicant: VMware, Inc., Palo Alto, CA (US)

(72) Inventors: Haiou Jiang, Beijing (CN); Dong Wang, Beijing (CN); David Snowdon, London (GB); Adam Gregory Gross, Los Altos, CA (US); Jin Yu, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 15 days.

(21) Appl. No.: 14/464,383

(22) Filed: Aug. 20, 2014

(65) Prior Publication Data

US 2016/0057135 A1    Feb. 25, 2016

(51) Int. Cl.
*H04L 29/06* (2006.01)
*G06F 3/01* (2006.01)

(52) U.S. Cl.
CPC ............. *H04L 63/0853* (2013.01); *G06F 3/01* (2013.01); *H04L 63/0428* (2013.01); *H04L 63/08* (2013.01)

(58) Field of Classification Search
CPC .... H04L 67/10; H04L 67/1095; H04L 47/824; H04L 63/0853; H04L 63/0428; H04L 63/08; G06F 17/30873; G06F 9/4445; G06F 3/01

USPC .......................................................... 713/172
See application file for complete search history.

(56) References Cited

U.S. PATENT DOCUMENTS

| | | |
|---|---|---|
| 2009/0293110 A1 | 11/2009 | Koga |
| 2011/0004680 A1* | 1/2011 | Ryman .................. G06F 9/4445 709/224 |
| 2012/0023167 A1* | 1/2012 | Hovdal ................ G06K 7/1095 709/204 |
| 2013/0179692 A1* | 7/2013 | Tolba ...................... H04L 63/08 713/179 |
| 2013/0212289 A1 | 8/2013 | Krishnakumar |
| 2013/0219479 A1 | 8/2013 | DeSoto |
| 2014/0052877 A1 | 2/2014 | Mao |
| 2014/0173125 A1* | 6/2014 | Selvanandan ......... H04L 67/141 709/229 |

\* cited by examiner

*Primary Examiner* — Yogesh Paliwal

(57) ABSTRACT

Image scanning and encoding technologies can be utilized to authenticate devices to virtual desktops and to transfer virtual desktop sessions between devices. One device (e.g., PC or laptop) may encode certain information into an image that is displayed on a display screen, while another mobile device equipped with a digital camera (e.g., mobile phone or tablet) can be used to scan the image on the display screen. Once the image is scanned, it can be decoded by the mobile device to get the information encoded in the image (e.g., device ID, session ID, etc.). The information obtained from the image can be used to authenticate a device or to transfer a virtual desktop session between the devices.

17 Claims, 7 Drawing Sheets

ACCESSING VIRTUAL DESKTOPS VIA IMAGE SCANNING

RELATED APPLICATIONS

This application is related to U.S. patent application Ser. No. 14/464,452, entitled "PUSHING A VIRTUAL DESKTOP SESSION FROM AN AUTHENTICATED DEVICE USING IMAGE SCANNING" by Haiou Jiang et al., filed on the same date as the present application and issued as U.S. Pat. No. 9,374,365 on Jun. 21, 2016, which is incorporated by reference in its entirety herein.

TECHNICAL FIELD

The present disclosure generally relates to virtual desktop environments and more particularly relates to authenticating virtual desktops and transferring virtual desktop sessions based on image scanning.

BACKGROUND

With the rising popularity of cloud computing, virtual desktop environments, such as those based on Virtual Desktop Infrastructure (VDI) and Desktop-as-a-Service (DAAS) have become rapidly growing industries. In a conventional VDI or DAAS environment, a user is provisioned a virtual desktop and is allowed to access their virtual desktop over a remote network connection, such as a WAN connection. The virtual desktops are typically hosted on servers that reside in a data center of the enterprise (or a third party service provider), and each host server may execute multiple virtual desktops. Users can utilize a client device to remotely log into their individual virtual desktop and all of the application execution takes place on the remote host server which is linked to the local client device over a network, using a remote display protocol such as remote desktop protocol (RDP), PC-over-IP protocol, virtual network computing (VNC) protocol, or the like. Using such a remote desktop protocol, the user can interact with applications of the virtual desktop, which are running on the remote host server, such that only the display, keyboard, and mouse information is communicated with the local client device. A common implementation of this approach is to host multiple desktop operating system instances on a server hardware platform running a hypervisor.

In many ways, VDI and DAAS provide a more centralized and efficient computing environment because each user is able to access their individual desktop from any device capable of making a network connection and from virtually any location. All of the user data is stored in the cloud (e.g., in a data center), providing more centralized management and quality of control for the organization that may employ the individual users.

However, a number of inconveniences and other issues remain in the context of virtual desktop environments. One form of inconvenience stems from the fact that users frequently utilize a variety of devices to remotely access their individual virtual desktop. For example, throughout the day a single user may log into their virtual desktop using a personal computer (PC), a laptop, a tablet computer and a mobile phone. Conventionally, the user would need to enter a username and password each time that he or she wishes to log into their virtual desktop. Moreover, when changing devices, the user would typically log out of the virtual desktop of one device only to log into the desktop using a different devices, sometimes losing any state information (e.g., open applications, etc.) and potentially data that was not saved before logging out.

DETAILED DESCRIPTION

Figure 1:
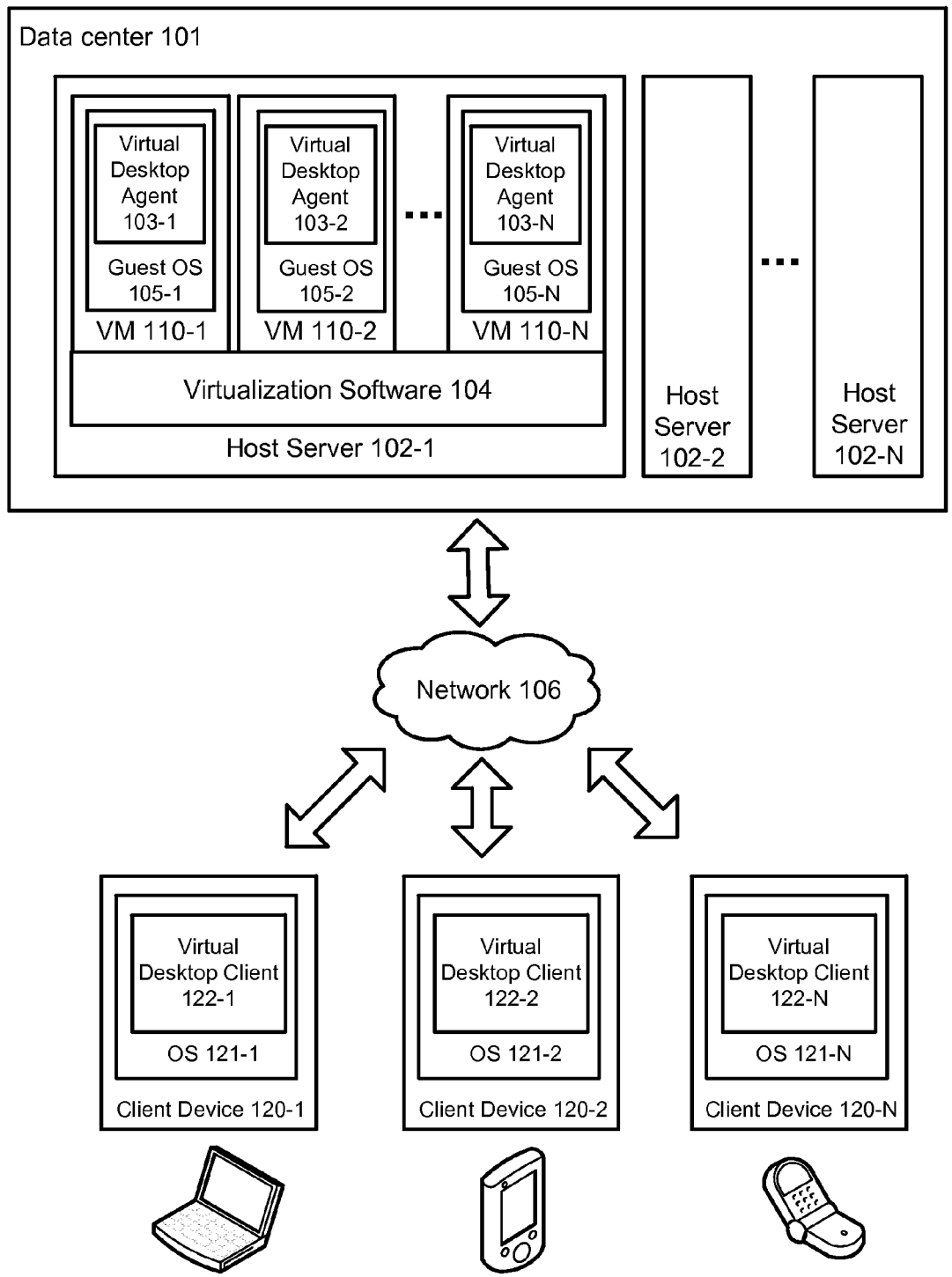
FIG. 1 illustrates an example of a virtual desktop infrastructure (VDI) environment, in accordance with various embodiments.

Systems and methods in accordance with various embodiments of the present disclosure overcome at least some of the above mentioned shortcomings and deficiencies by providing more efficient ways to access virtual desktops from various devices. In particular, embodiments described herein utilize image scanning and encoding technologies, such as Quick Response (QR) codes in order to authenticate devices to virtual desktops and to transfer virtual desktop sessions between devices. In various embodiments, one device (e.g., PC or laptop) may encode certain information into an image that is displayed on a display screen, while another mobile device equipped with a digital camera (e.g., mobile phone or tablet) can be used to scan the image on the display screen. Once the image is scanned, it can be decoded by the mobile device to get the information encoded in the image (e.g., device ID, session ID, etc.). The information obtained from the image can be used to authenticate a device or to transfer a virtual desktop session between the devices. For example, in some embodiments, the virtual desktop session can be pulled from an authenticated computer (e.g., PC) to an unauthenticated mobile device by scanning the image. In other embodiments, the virtual desktop session can be pushed from an authenticated mobile device to an unauthenticated computer by scanning the image. In many embodiments, the information encoded in the image can be encrypted in order to prevent unwanted users from scanning the image and gaining access to the information.

As used herein, the terms "virtual desktop" and "desktop" are used interchangeably and refer to an instance of an operating system or application that runs remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user that owns the virtual desktop can remotely log into their virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

In one embodiment, a virtual desktop session can be pulled or migrated from an authenticated computer client device to an unauthenticated mobile device equipped with a digital camera. For example, a user may be logged into their individual virtual desktop using a personal computer (PC). When the user is logged in, the virtual desktop client application on the computer has established a session with the virtual desktop executing on a remote server. At some point, the user may wish to transfer the virtual desktop session from the computer to their mobile device (e.g., take their session "on the go" when leaving the house). In order to transfer the session, the authenticated computer may display an image, such as a QR code, that is encoded with information used to migrate the session to another device. For example, the information may include a unique session identifier (ID) which the mobile device can use to establish a connection with a broker. Once the QR code is displayed, the mobile device can use its digital camera to capture the image of the QR code and decode the information therein. In some embodiments, the information may be encrypted by the computer using a cryptographic key before encoding the information into the image. At the time of displaying the image, the computer may upload the cryptographic key to the broker. The mobile device may then scan the image, get the encrypted information and then contact the broker to obtain the cryptographic key. The broker can verify that the mobile device is permitted to access the virtual desktop (e.g., by checking a whitelist of devices) and return the cryptographic key to the mobile device if it passes verification. The mobile device may then use the key to decrypt the information encoded in the image to get the session ID and use the session ID to establish the virtual desktop session. In at least some embodiments, the session ID of the authenticated PC will be used to request the broker to clone another session for the mobile device without requiring any inputting of credentials. In this case, the cloned session for the mobile device would be associated with a new session ID that is different from the original session ID of the PC.

In another embodiment, the virtual desktop session may be pushed or migrated from an authenticated mobile device to an unauthenticated computer. For example, a user may be logged into their individual virtual desktop using a mobile device, such as a phone or tablet that is also equipped with a digital camera. In this case, the mobile device is authenticated since it has an established virtual desktop session. An unauthenticated computer (e.g., PC or laptop) has requested a server connection (e.g., from the broker) and is displaying an image (e.g., QR code) on its display screen, for example on a login page of the virtual desktop client application. This makes it possible for the broker to locate the client connection and then inform the client to authenticate without credentials. The QR code contains information identifying the computer that has not yet been authenticated. For example, the QR code may be encoded with a unique device ID associated with the computer, an Internet Protocol (IP) address of the computer, an IP address of a connection broker, and/or a unique client ID associated with the virtual desktop client application. The mobile device can scan the QR code, get the information identifying the unauthenticated computer and contact the broker to establish the connection. Since the mobile client device has been authenticated, it is able to directly send requests to the broker. The mobile client device can send the session ID of its current session and other necessary information for broker's verification, including the client ID and the device ID of the unauthenticated computer. It can also send the IP address of the unauthenticated computer to the broker. The broker will check whether the client ID and device ID are entitled to this functionality (e.g., determine whether the unauthenticated computer is on a whitelist of devices permitted to access the virtual desktop). If the computer passes the verification, the broker will send that message to the computer to inform the client to start a connection.

In yet other embodiments, the virtual desktop session can be migrated between multiple mobile devices (e.g., from one mobile phone to another mobile phone) or between multiple computers (e.g., from one laptop to another or from one PC to another). Because mobile devices are typically equipped with a digital camera, the virtual desktop session can be migrated between two mobile phones using either technique described above. Similarly, some laptops and personal computers are also equipped with digital cameras and the embodiments described herein are equally applicable to such devices.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a local area network (LAN), wide area network (WAN) or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as to not obscure salient features of the VDI environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102. In this context, the term "desktop" refers to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client application (e.g., 122-1, 122-2, 122-N). The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
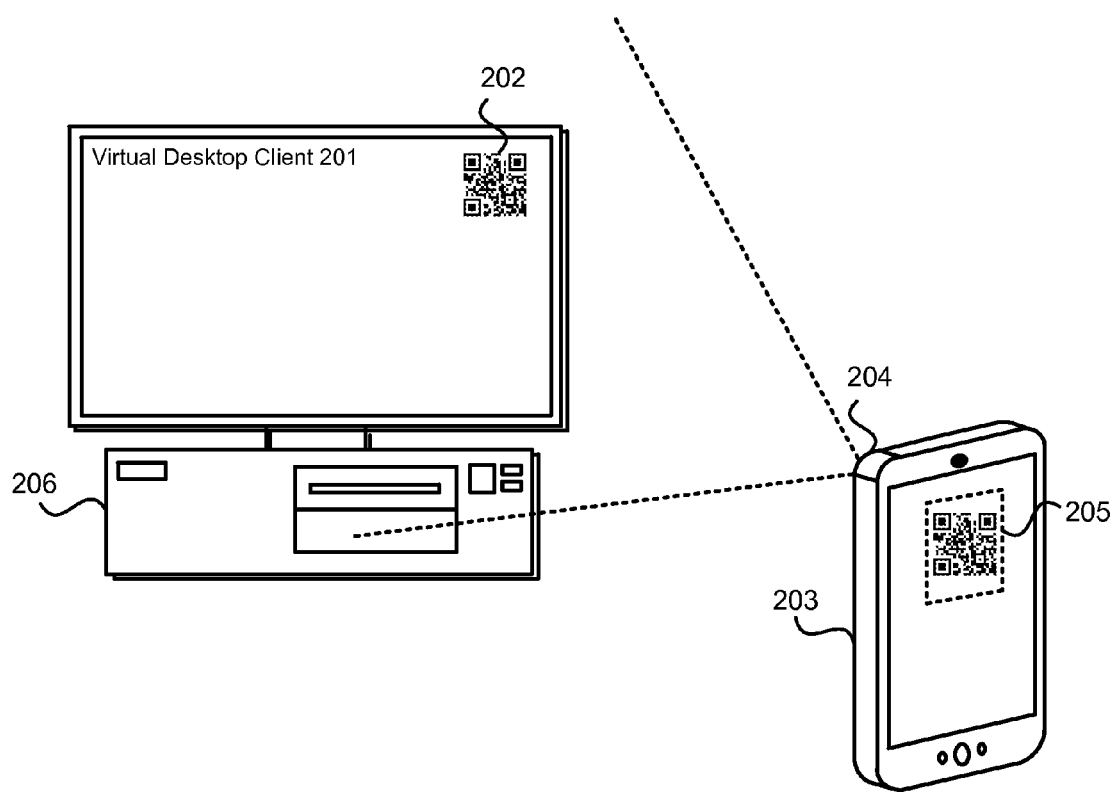
FIG. 2 illustrates an example of using image scanning to authenticate devices to virtual desktops or transfer virtual desktop sessions between devices, in accordance with various embodiments.

FIG. 2 illustrates an example of using image scanning to authenticate devices to virtual desktops or transfer virtual desktop sessions between devices, in accordance with various embodiments. As shown in this example, a PC client device 206 can display an image, in this case a Quick Response (QR) code 202 on the display screen. A QR code is a type of well-known matrix barcode (or two-dimensional barcode) which was first designed for the automotive industry in Japan. The QR code is a machine-readable optical label that contains information about the item to which it is attached. The QR code encodes data into an image which can be read by another machine. In various embodiments described herein, the QR code can be used to transmit data from one device to another.

In various embodiments, the QR code 202 can be displayed on the display screen of a client device (e.g., a PC, laptop, tablet, mobile phone, etc.) and be encoded with information that is used to authenticate a device to a virtual desktop or to transfer a virtual desktop session from one device to another. The QR code may be displayed by a virtual desktop client application running on the device at any number of different locations or times. For example, in some embodiments, the QR code may be displayed on the login page of the virtual desktop client application. In other embodiments, the QR code may be displayed on the corner of the desktop screen of the virtual desktop. Furthermore, the QR code may be displayed permanently or at selected times, such as in response to the user requesting the QR code to be displayed.

In some embodiments, the QR code 202 may be displayed within the windows of certain applications. This may be useful in the context of application remoting, i.e., in cases when only certain applications are remoted from the host server to the client device, rather than the entire desktop of the user. In those cases, the QR code can be used to transfer the session of the application between devices rather than the entire desktop session.

The QR code 202 can be encoded with many different types of information that may be used to authenticate devices or transfer virtual desktop sessions between devices. By way of example, the QR code may be encoded with unique device IDs, unique client IDs, unique session IDs, and/or IP addresses, among other types of information. The QR code is encoded with the information by the PC client device 206 using QR code generator software, such as QRencoder. Once displayed, the QR code may be captured using a digital camera 204 of a mobile device 203. For example, the user may start the camera viewer application on the mobile device 203 and aim the camera 204 of the mobile device 203 at the QR code in order to place the QR code within the field of view (FOV) of the digital camera 204 and to enable the mobile device to scan the QR code 205. The mobile device 203 may contain barcode reader software to scan the QR code and to decode the information encoded therein. One example of such a barcode reader software is Zbar which is a C barcode reading library with C++, Python, Perl, and Ruby bindings.

In certain embodiments, the information encoded in the QR code may be encrypted using a cryptographic key. For example, it may be desirable to prevent any unwanted user in the vicinity that may have a device with QR decoding capability from gaining access to the information (e.g., snapping a picture of the QR code over the shoulder of the user). Many different encryption schemes can be utilized to encrypt the information, including symmetric or asymmetric forms of encryption. The PC client device 206 may encrypt the information prior to encoding the information into the QR code 202. Once the information has been encrypted, the PC client device 206 can transmit a decryption key to a remote connection broker. The mobile client device may then contact the connection broker and verify its identity to the broker in order to get the key for decrypting the information. In various embodiments, the cryptographic key is only effective during the current session and will be deleted by the broker after the session is terminated by the user. If a user with another device wants to get access to the session (or a cloned copy of the session), they would have to first scan the image and decode it to get the encrypted data. Then the client should send a message to broker in order to request the key for decryption. The message contains the client ID and the unique device ID. Broker would verify the request based on the client ID and the device ID. If the verification is passed, the broker could also inform the virtual desktop session which currently has the active session to give the user an opportunity to confirm the session access request. Only after the user confirms the request, the key is sent to the second client device. After the data is correctly decrypted, the second client can establish the connection to the broker.

In addition to (or instead of) encrypting the QR code, the lifetime of the QR code can be constrained to a limited time interval. For example, the QR code can be set to expire after 1 minute of display time, after which it is no longer active. Alternatively, the QR code can be associated with a maximum number of use times. For example, once the QR code has been used to migrate a session, it may be disabled such that it cannot be reused by another device.

Figure 3:
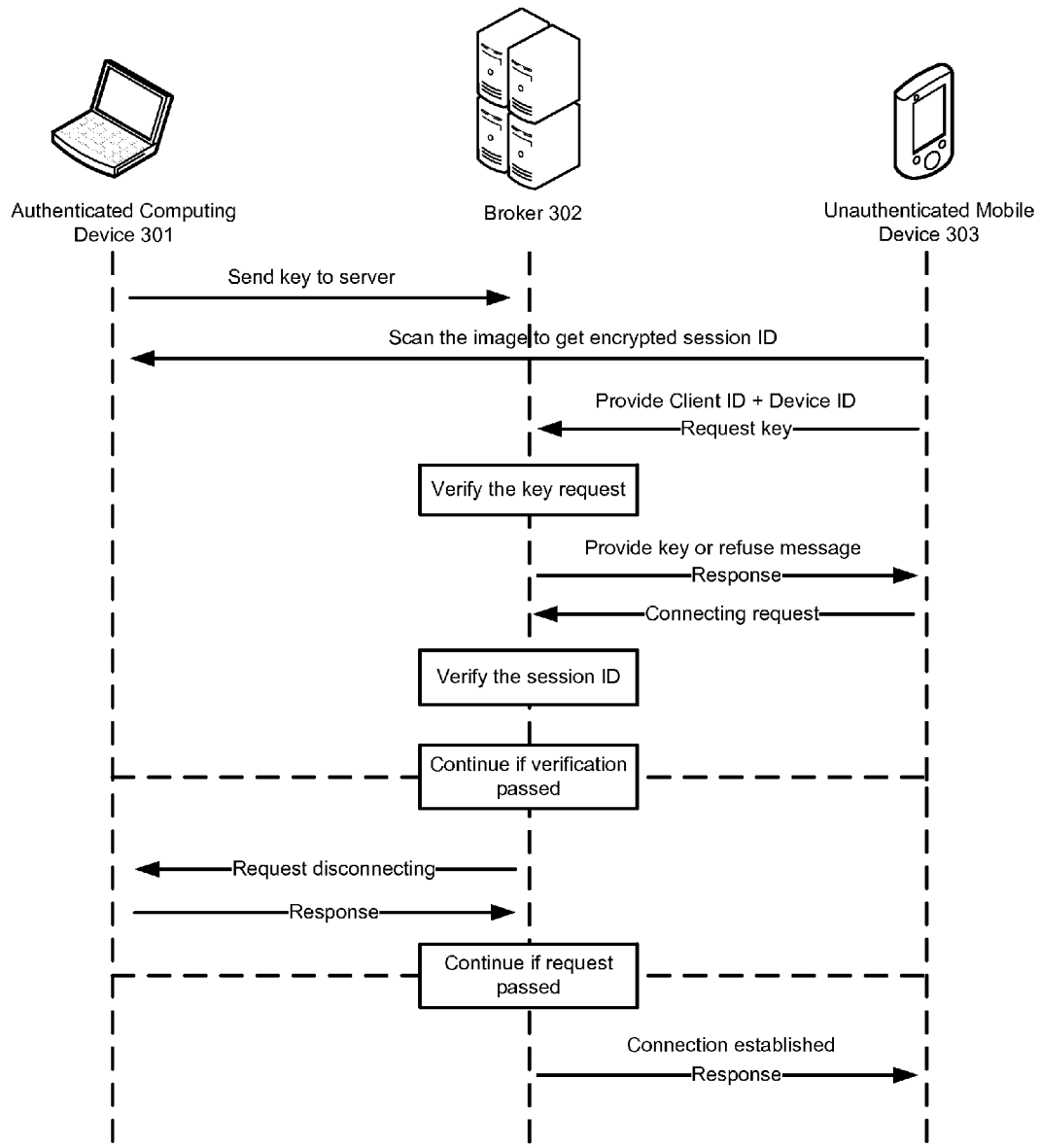
FIG. 3 illustrates an example of migrating a virtual desktop session from an authenticated computing device to an unauthenticated mobile device via image scan, in accordance with various embodiments.

FIG. 3 illustrates an example of pulling a virtual desktop session from an authenticated computing device to an unauthenticated mobile device via image scan, in accordance with various embodiments. As previously discussed, an authenticated computing device 301 having an established virtual desktop session may display an image that is encoded with information that can be used to migrate the session from the computing device 301 to an unauthenticated mobile device 303. In the embodiment illustrated in this figure, the information contains the unique session ID of the virtual desktop session established on the computing device 301 and the information is encrypted by the computing device 301 prior to being encoded into the image.

As shown in the illustration, once the information has been encrypted, the computing device transmits the cryptographic key to a remote connection broker 302. In various embodiments, the broker 302 can be located in a remote datacenter and it is responsible for authenticating various devices and setting up virtual desktop sessions. In one embodiment, the connection broker 302 is software running on a server inside of the datacenter.

Once the image is displayed by the authenticated computing device 301, it can be scanned by the unauthenticated mobile device 303 to get the information encoded therein. Once the unauthenticated mobile device 303 decodes the information from the image, it still needs the cryptographic key for decrypting the information. Thus, after scanning the image, the mobile device 303 communicates with the connection broker 302 in order to get the cryptographic key. The client on the mobile device 303 will send its unique client ID and device ID to the broker 302 to request the key used for decryption. The broker 302 can verify the request by checking whether the mobile device 303 is listed on its whitelist of devices that are permitted to access the virtual desktop. The whitelist may be preconfigured or set up by an administrator.

If the request passes the verification, the broker 302 sends a message to the authenticated computing device 301 to inform it that another device is requesting to get the session. The user may then be provided with an option to approve or deny that request. If the user confirms the request, the broker 302 will provide the virtual desktop client on the mobile device with the desired key. The mobile device 303 will then establish the session with the broker 302 using the decrypted data (which includes the session ID). For example, in one embodiment, the mobile device may use the session ID retrieved from the image to request the broker 302 to clone a session for the mobile device without inputting any credentials by the user. This cloned session may be associated with a new session ID, however, it would be a copy of the session that was established on the authenticated computing device 301. Meanwhile, the former session on the computing device 301 will be terminated, as shown in the figure. After the process is completed, the session on computing device 301 will be successfully migrated to the mobile device 303.

It should be noted that FIG. 3 illustrates a scenario where the virtual desktop on the computing device 301 has been authenticated and has an active session, which is then migrated to the mobile device 303. In cases where the virtual desktop client on the computing device 301 has been authenticated but has no active sessions, the client on the mobile device 303 will be authenticated automatically without actually migrating any session.

Figure 4:
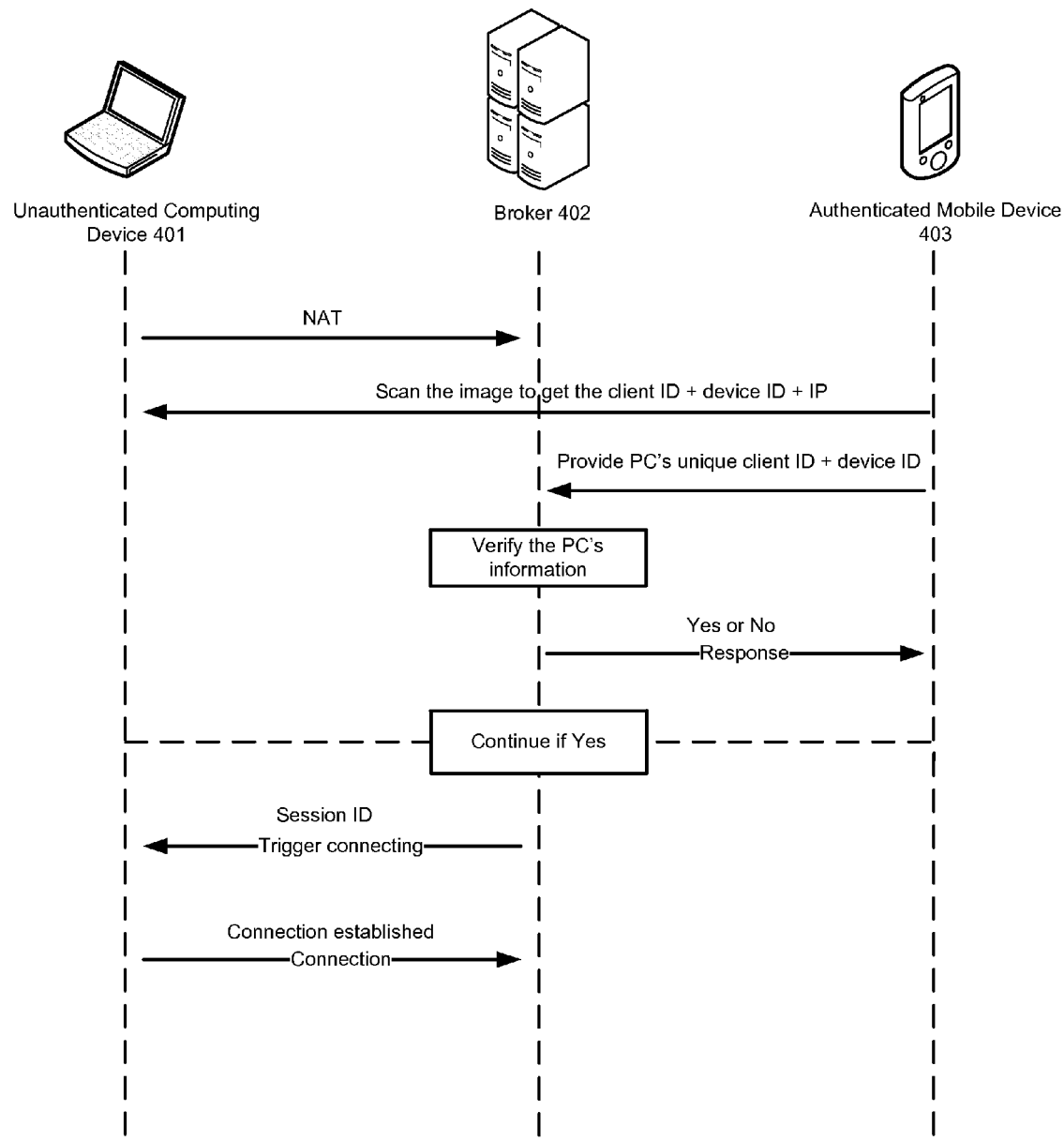
FIG. 4 illustrates an example of pushing a virtual desktop session from an authenticated mobile device to an unauthenticated computer, in accordance with various embodiments.

FIG. 4 illustrates an example of pushing a virtual desktop session from an authenticated mobile device to an unauthenticated computer, in accordance with various embodiments. In this illustration it is assumed that the computing device 401 is unauthenticated whereas there has been an authenticated session established on the mobile device 403. In some embodiments, the precondition to pushing a virtual desktop session in this way may be that the unauthenticated PC has requested a server connection and is displaying a login page (e.g., the page for entering the username/password) with a QR code thereon, which enables the broker to locate the client connection and then inform the client that authenticating without credentials is possible.

In the illustrated embodiment, the unauthenticated computing device 401 first communicates with the broker 402 to perform network address translation (NAT) so that the connection from the client will be located by the broker 402 from its pending pool of connections to enable proactive notification from the broker 402. The virtual desktop client on the unauthenticated computing device 401 then encodes the client ID, unique device ID and IP information into the image (e.g., QR code) and displays the image on the screen. For example, the image may be displayed on the login page of the virtual desktop client on the computing device 401 as an alternative option to use instead of manually entering a password when logging in.

When the mobile client 403 scans the image, it will obtain the information identifying the computing device 401. Since in this scenario the mobile client 403 has already been authenticated, it is able to directly send requests to the broker 402. The mobile client 403 sends the session ID and other necessary information for broker's verification, including the client ID and the device ID of the computing device 401 which the mobile device obtained from scanning the image. The mobile device 403 can also send the IP address of the unauthenticated computing device 401 to the broker 402. Broker 402 checks whether the client ID and device ID are entitled for this functionality. For example, the broker 402 may determine (using the client ID and device ID) whether the computing device 401 is on the whitelist of devices that are permitted to access the virtual desktop. If the computing device 401 passes the verification, the broker 402 will send the message to the computing device 401 to inform the virtual desktop client on the computing device 401 to start a connection.

As previously described, the information encoded in the image may be encrypted or simply left in unencrypted form. If the information is not encrypted, anyone scanning the image displayed by the virtual desktop client could obtain the original data. In such cases, it may be useful to end any unauthorized attempts at automatic authentication or migration prior to any interaction with the broker. For example, suppose a user uses an authenticated mobile phone to scan the QR code on an unauthenticated PC, and the mobile phone retrieves the IP address of the broker from the image displayed on the PC. Before the communication with broker is started, the virtual desktop client on the mobile phone should check whether the two broker IP addresses are the same, if they are, inform the broker to continue, otherwise an error message should be prompted and the connection should be terminated.

Figure 5:
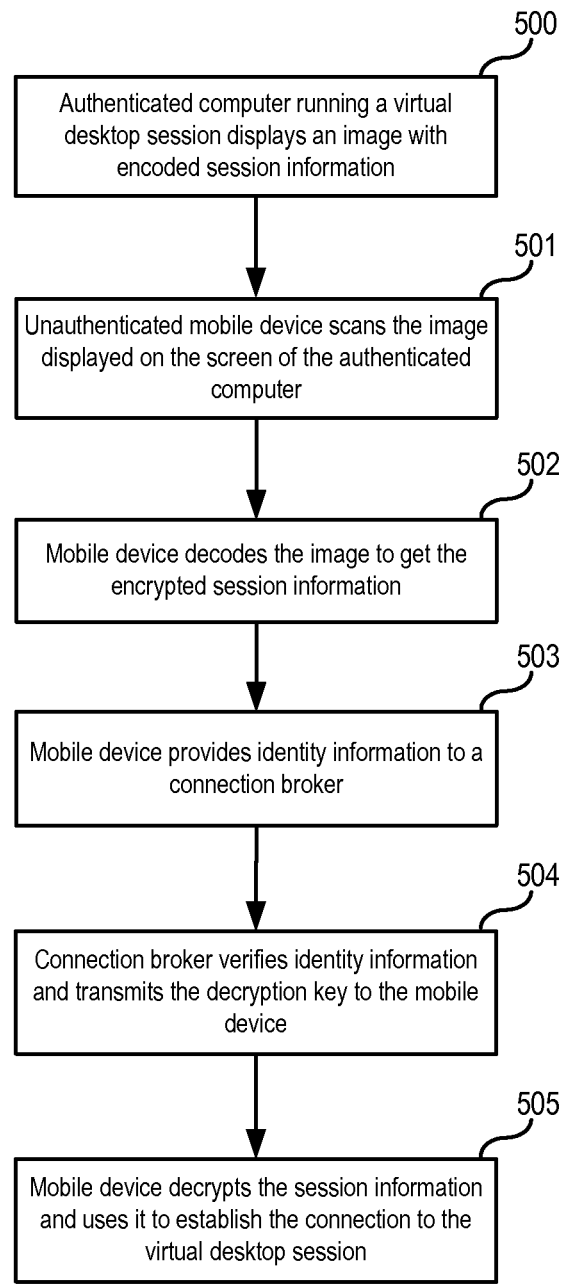
FIG. 5 illustrates an example of a process for migrating a session from an authenticated computer to an unauthenticated mobile device equipped with a digital camera, in accordance with various embodiments.

FIG. 5 illustrates an example of a process for pulling a session from an authenticated computer to an unauthenticated mobile device equipped with a digital camera, in accordance with various embodiments. As shown in operation 500, the authenticated device having an active virtual desktop session displays an image (e.g., a QR code) on the display screen. The image has encoded information that can be used to transfer the active session from the authenticated computing device to another device or to simply authenticate another device. The image may be displayed anywhere on the display screen of the authenticated computer, such as in the corner of the desktop screen or the like. In some embodiments, the image is only displayed once the user requests the virtual desktop client to display the image.

In operation 501, an unauthenticated mobile device equipped with a digital camera scans the image that is displayed by the authenticated computing device. In operation 502, the mobile device decodes the information encoded in the image to get the encrypted session information. Because the information is encrypted, the unauthenticated mobile device contacts a remote connection broker, as shown in operation 503. In one embodiment, the virtual desktop client on the unauthenticated mobile device provider its own unique client ID and the device ID of the mobile device to the broker. The broker uses this information to verify that the mobile device is permitted to access the virtual desktop and if verification is passed, the broker transmits the key to the mobile device, as shown in operation 504. For example, the broker may check a whitelist of permitted devices to determine verify the mobile device.

In operation 505, the mobile device uses the key received from the broker to decrypt the information encoded in the image. For example, the virtual desktop client on the mobile device can decrypt the information to get the unique session ID of the virtual desktop session established on the authenticated computing device which originally displayed the image. The virtual desktop client on the mobile device then uses the decrypted information to migrate the virtual desktop from the computing device to the mobile device.

Figure 6:
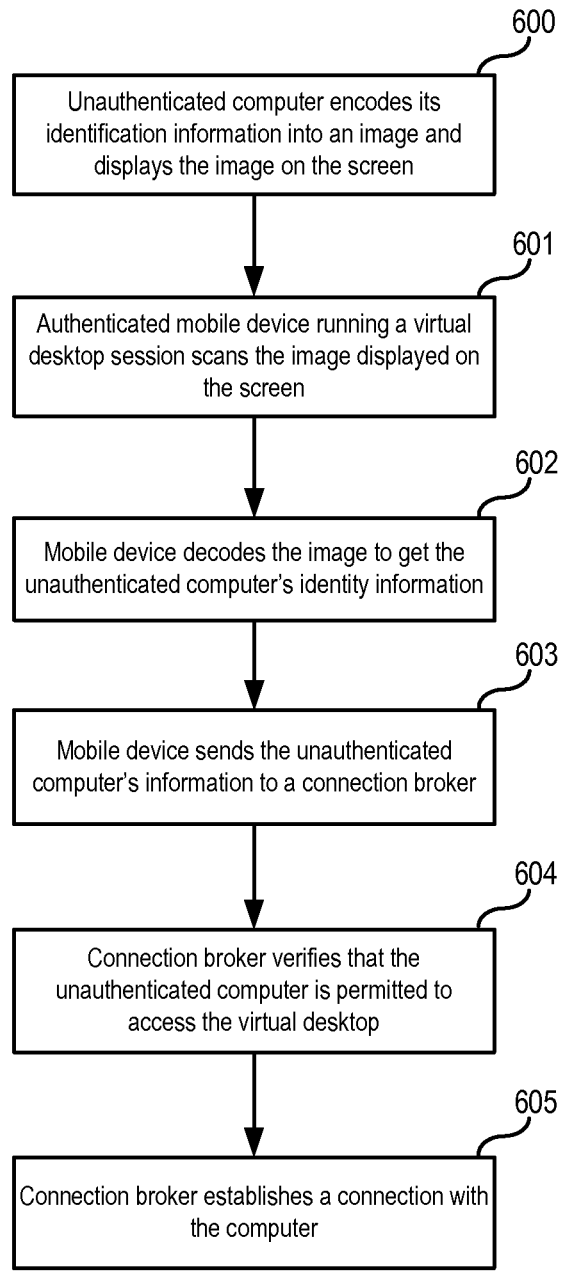
FIG. 6 illustrates an example of a process for pushing a virtual desktop session from an authenticated mobile device equipped with a camera to an unauthenticated computing device, in accordance with various embodiments.

FIG. 6 illustrates an example of a process for pushing a virtual desktop session from an authenticated mobile device equipped with a camera to an unauthenticated computing device, in accordance with various embodiments. As shown in operation 600, the unauthenticated computing device encodes information identifying itself into an image and displays the image on the display screen. For example, the unauthenticated computing device may encode its IP address, device ID and the client ID of the virtual desktop client installed thereon.

In operation 601, a user on an authenticated mobile device uses the device to scan the image displayed by the unauthenticated computing device. The information may be in encrypted or unencrypted form. In operation 602, the mobile device decodes the image to get the identity information. In operation 603, the virtual desktop client on the mobile device sends the identity information to the broker, requesting the broker to transfer the virtual desktop session to the unauthenticated device.

In operation 604, the connection broker verifies that the unauthenticated computing device is permitted to access the virtual desktop, such as be checking a whitelist of permitted devices. If the unauthenticated computer is on the whitelist, the broker contacts the computing device and establishes a virtual desktop session thereon, as shown in operation 605.

Figure 7:
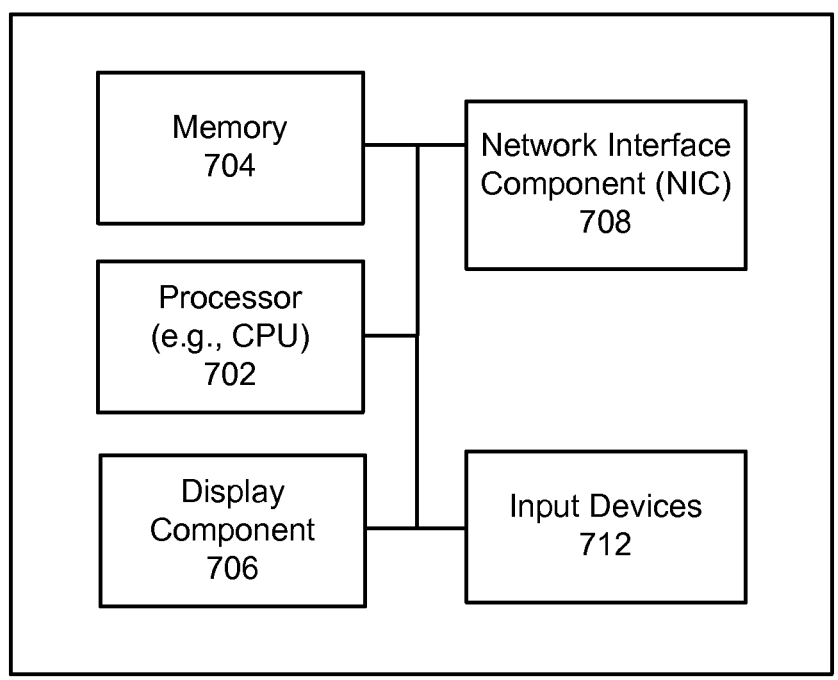
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702 for executing instructions that can be stored in physical memory component 704. The memory component 704 can include many types of memory, data storage, or non-transitory computer-readable storage media, such as random access memory (RAM) storing program instructions for execution by the processor 702, a separate form of storage for images or data, a removable memory for sharing information with other devices and the like. The computing device typically can further comprise a display component 706, such as a monitor, a touch screen, liquid crystal display (LCD), or the like. In various embodiments, the computing device will include at least one input device 708 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 708 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for accessing a virtual desktop via image scanning, said method comprising:

capturing an image displayed on a display screen of an authenticated computing device using a digital camera of an unauthenticated mobile device, the image encoded with information including a session identifier that identifies a virtual desktop session established on the authenticated computing device, wherein the information has been encrypted using a cryptographic key;

decoding the image by the mobile device to read the information including the session identifier, wherein decoding the image further comprises:

requesting the cryptographic key from a connection broker by the mobile device;

receiving the cryptographic key from the connection broker by the mobile device in response to the connection broker authenticating the mobile device; and decrypting the information by the mobile device using the cryptographic key received from the connection broker;

transmitting the information including the session identifier from the mobile device to the connection broker; and causing the virtual desktop session to be migrated from the computing device to the mobile device, the virtual desktop session migrated by the connection broker using the information decoded from the image including the session identifier.

2. The method of claim 1, wherein the cryptographic key is transmitted from the computing device to the connection broker after encrypting the information encoded in the image.

3. The method of claim 1, wherein the connection broker authenticates the mobile device based on a white list that identifies all devices permitted to access the virtual desktop.

4. The method of claim 1, wherein the image is a Quick Response (QR) code displayed by a client application executed on the computing device, the client application providing an interface to the virtual desktop.

5. The method of claim 1, wherein the virtual desktop is provided by a virtual machine executing on a host server in a data center that is remotely located with respect to the computing device and the mobile device.

6. The method of claim 1, wherein causing the virtual desktop session to be migrated further comprises causing the virtual desktop session to be cloned for the mobile device and causing the virtual desktop session to be terminated on the computing device upon cloning the virtual desktop session for the mobile device.

7. A mobile device, comprising:

a digital camera;

at least one processor; and memory including instructions that, when executed by the at least one processor, cause the computing device to:

capture an image displayed on a display screen of an authenticated computing device using the digital camera, the image encoded with information including a session identifier that identifies a virtual desktop session established on the authenticated computing device, wherein the information has been encrypted using a cryptographic key;

decode the image to read the information including the session identifier, wherein decoding the image further comprises:

requesting the cryptographic key from a connection broker by the mobile device;

receiving the cryptographic key from the connection broker by the mobile device in response to the connection broker authenticating the mobile device; and decrypting the information by the mobile device using the cryptographic key received from the connection broker;

transmit the information including the session identifier to the connection broker;

cause the virtual desktop session to be migrated from the computing device to the mobile device, the virtual desktop session migrated by the connection broker using the information decoded from the image including the session identifier.

8. The mobile device of claim 7, wherein the cryptographic key is transmitted from the computing device to the connection broker after encrypting the information encoded in the image.

9. The mobile device of claim 7, wherein the connection broker authenticates the mobile device based on a white list that identifies all devices permitted to access the virtual desktop.

10. The mobile device of claim 7, wherein the image is a Quick Response (QR) code displayed by a client application executed on the computing device, the client application providing an interface to the virtual desktop.

11. The mobile device of claim 7, wherein the virtual desktop is provided by a virtual machine executing on a host server in a data center that is remotely located with respect to the computing device and the mobile device.

12. The mobile device of claim 7, wherein causing the virtual desktop session to be migrated further comprises causing the virtual desktop session to be cloned for the mobile device and causing the virtual desktop session to be terminated on the computing device upon cloning the virtual desktop session for the mobile device.

13. A non-transitory computer readable storage medium comprising one or more sequences of instructions, the instructions when executed by one or more processors causing the one or more processors to execute the operations of:

capturing an image displayed on a display screen of an authenticated computing device using a digital camera of an unauthenticated mobile device, the image encoded with information including a session identifier that identifies a virtual desktop session established on the authenticated computing device, wherein the information has been encrypted using a cryptographic key;

decoding the image by the mobile device to read the information including the session identifier, wherein decoding the image further comprises:

requesting the cryptographic key from a connection broker by the mobile device;

receiving the cryptographic key from the connection broker by the mobile device in response to the connection broker authenticating the mobile device; and decrypting the information by the mobile device using the cryptographic key received from the connection broker;

transmitting the information including the session identifier from the mobile device to the connection broker; and causing the virtual desktop session to be migrated from the computing device to the mobile device, the virtual desktop session migrated by the connection broker using the information decoded from the image including the session identifier.

14. The non-transitory computer readable storage medium of claim 13, wherein the cryptographic key is transmitted from the computing device to the connection broker after encrypting the information encoded in the image.

15. The non-transitory computer readable storage medium of claim 13, wherein the connection broker authenticates the mobile device based on a white list that identifies all devices permitted to access the virtual desktop.

16. The non-transitory computer readable storage medium of claim 13, wherein the image is a Quick Response (QR) code displayed by a client application executed on the computing device, the client application providing an interface to the virtual desktop.

17. The non-transitory computer readable storage medium of claim 13, wherein the virtual desktop is provided by a virtual machine executing on a host server in a data center that is remotely located with respect to the computing device and the mobile device.

* * * * *